No. 851,239. PATENTED APR. 23, 1907.
J. D. IHLDER.
CONTROLLING DEVICE FOR ELECTRIC MOTORS.
APPLICATION FILED SEPT. 27, 1904.
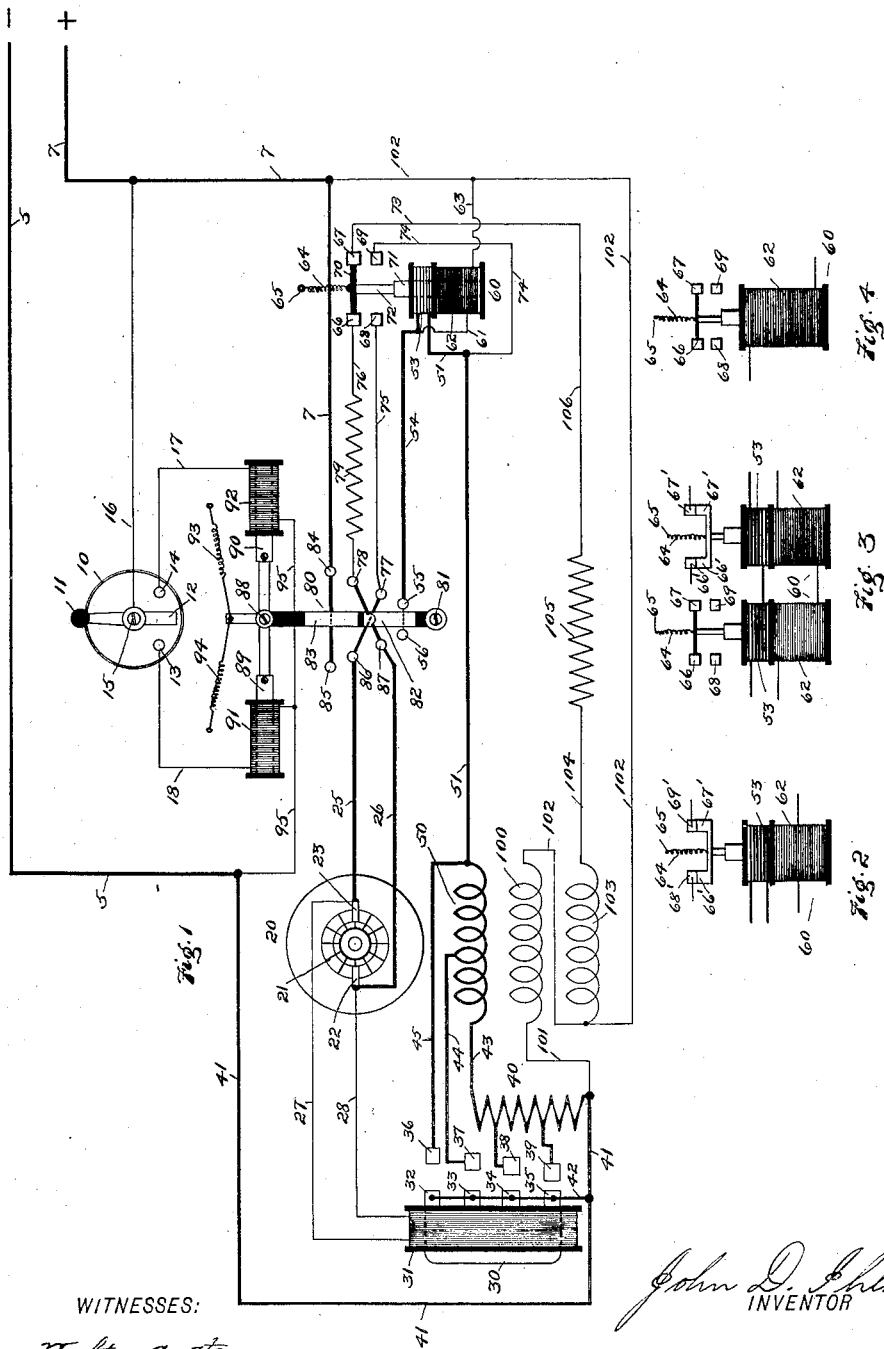
WITNESSES:
Walter C. Strang
Henry E. Kirby
John D. Ihlder
INVENTOR
BY
E. W. Marshall
ATTORNEY

UNITED STATES PATENT OFFICE.

JOHN D. IHLDER, OF YONKERS, NEW YORK, ASSIGNOR TO OTIS ELEVATOR COMPANY, OF JERSEY CITY, NEW JERSEY, A CORPORATION OF NEW JERSEY.

CONTROLLING DEVICE FOR ELECTRIC MOTORS.

No. 851,239.     Specification of Letters Patent.     Patented April 23, 1907.

Application filed September 27, 1904. Serial No. 226,116.

*To all whom it may concern:*

Be it known that I, JOHN D. IHLDER, a citizen of the United States, residing at Yonkers, in the county of Westchester and State of New York, have invented a certain new and useful Improvement in Controlling Devices for Electric Motors, of which the following is a specification.

My invention relates to controlling devices for electric motors.

The object of the invention is to provide means arranged to be brought into operation automatically when the motor attains an undue or excessive speed for impeding, retarding or stopping the motor.

A further object of the invention is to provide electrical devices arranged to operate automatically when the motor attains undue or excessive speed for electrically retarding or impeding the operation of the motor.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the accompanying drawing, and to the various views and reference signs appearing thereon,—Figure 1 is a view in diagram showing one form in which my invention may be applied to the control of an electric motor. Figs. 2, 3, and 4 illustrate modifications of details.

The same part is designated by the same reference sign wherever it occurs throughout the several views.

In the operation of electric motors and particularly motors which are required to operate under frequently varying conditions of load, as, for instance, in the special field of electric elevators, the motor sometimes attains an undue or excessive speed. This is particularly true in the case of motors employed in electric elevator service when the motor is driven by the load and thereby becomes a generator.

It is among the special purposes of my present invention to provide means which are simple, efficient and automatic in operation for imposing a retarding influence upon the motor. This object may be accomplished in many specifically different ways, as by applying an electro-dynamic brake to the motor, by strengthening the magnetic field of the motor, or by breaking the motor circuit and thereby stopping the motor, or by combining these several methods, and in carrying out my invention I propose to provide means operated automatically when the motor attains an undue or excessive speed for accomplishing the objects and purposes stated.

It is obvious that my invention may be applied to many different styles and types of motor and accessory devices for starting, stopping, reversing and controlling the motor. While, therefore, I have selected for purposes of illustration a certain type of motor and controlling devices therefor, I desire it to be understood that my invention is not to be limited or restricted thereto, as variations therefrom and changes therein would readily suggest themselves to persons skilled in the art without departure from the spirit and scope of my invention and without affecting the objects and purposes attained by my invention or the cooperative operation thereof.

In the drawing reference sign 20, designates a motor, 21 the armature thereof, 22, 23 its brushes, 50 field coils, 40 a resistance, the field coils 50 and resistances 40 designed, in starting up the motor, to be included in series with the armature, and 100 designates the shunt field coils.

Any suitable arrangement and construction may be employed for successively cutting out or short circuiting the resistances 40, and the series field coils 50, as the motor speeds up. I have selected for purposes of illustration one form of mechanism for accomplishing this result, to which, however, my invention is not to be limited or restricted, and comprising a magnet 30, the coil 31 of which is included in a shunt circuit 27, 28, across the brushes of the motor. By this arrangement it will be readily seen that as the motor accelerates the strength of magnet 30 increases, and as the strength of said magnet increases it may be employed to successively cut out or short circuit the starting resistance 40, and the series field coils, as, for instance, by successively attracting the contacts 39, 38, 37 and 36, to contacts 35, 34, 33 and 32, in a well understood manner.

Any suitable form, construction and arrangement of starting, stopping and reversing switches may be employed. While, therefore, I have selected for purposes of illustration simple construction of switches, and which I have found in practice to be well adapted for the purpose, I desire it to be understood that my invention is in no wise to be limited or restricted to the forms shown.

A simple starting and stopping switch is shown as 10, and comprises a movable member or contact 12, provided with an operating handle 11, and adapted to be brought into contact with either one or the other of coöperating contacts 13, 14. The contact 12 is connected to the positive main 7, through wire 16. The coils of magnets 91, 92, are respectively included in circuit on one side through wires 18 and 17, with contacts 13 and 14, and on the other side through wire 95, to the negative main 5. The magnets 91, 92 control a reversing switch, and which as above indicated may be of any suitable form or construction. In the form selected for purposes of illustration this switch comprises a lever 80, pivoted as at 81, and to which are connected as at 88, the cores 89, 90, of magnets 91, 92, respectively, so that said lever may be rocked or swung in one direction or the other according as one or the other of magnets 91, 92, is energized. The lever 80, includes suitably insulated conducting parts 82, 83. The part 82 operates to bridge contacts 87 and 56, when lever 50 is rocked in one direction, and to bridge contacts 77 and 55, when said lever is rocked in the other direction. Similarly, part 83 serves to bridge contacts 85, 86, or 84, 78, according to the direction in which lever 80 is rocked. Contacts 85, 84, are connected together electrically and also to the positive main 7. Contacts 77 and 86 are electrically connected together, and, through wire 25, to the motor brush 23, while contacts 78 and 87, are electrically connected, and, through wire 26, to the motor brush 22. The contacts 56, 55, are connected together, and through wires 54 and 51, are in series with the series field 50, resistances 40, and wire 41, to the negative main 5. The shunt field 100 is connected on one side through wire 102 with the positive main 7, and on the other side through wires 101 and 41, to the negative main 5. If desired, the reversing switch lever 80, may be held in central position in any convenient manner, as, for instance, by means of the springs 93, 94.

The parts so far described and referred to and as above indicated, may be of any suitable construction and arrangement, and in the specific construction and arrangement of the details thereof form no part of my present invention, being selected merely for purposes of illustration and as showing constructions and arrangements which I have found practical and efficient in operation and in coöperation with my present invention.

In carrying out my invention and in association with a motor and accessory devices of the general nature above referred to, and as indicated, I propose to provide means whereby the motor may be automatically slowed down or stopped upon attaining an undue or excessive speed, and it is obvious that this result may be accomplished in many specifically different ways.

In one form of embodiment of my invention I propose to apply an electro-dynamic brake, and this I acomplish by automatically completing a shunt circuit across the armature and in which circuit is placed resistance, and I propose to complete this shunt circuit automatically by the undue or excessive speed developed by the motor or by the current generated by the motor when it is run as a generator. To illustrate this means of accomplishing the desired object, I have shown a resistance 79, connected on one side to contact 78, and on the other side through wire 76, to a contact 66. A coöperating contact 68 is connected through wire 75, to contact 77. This shunt circuit is normally open between contacts 66 and 68. Any suitable means, such, for instance, as a magnet 60, arranged to be properly and suitably energized sufficiently, when the motor attains an undue or excessive speed, or becomes a generator, may be used to close the circuit between contacts 66 and 68. The resistance 79, when its circuit is closed, thus forms in effect an electro-dynamic brake and its tendency is to slow down the motor.

In another form of embodiment of my invention I propose to provide means operated automatically, when the speed of the motor unduly increases or becomes excessive, or when the motor becomes a generator, for strengthening the magnetic field of the motor. This result may be accomplished in many specifically different ways. To illustrate one form of means for accomplishing this result, I have shown an extra shunt field winding 103, the circuit of which is connected on one side through wire 102, in shunt with the armature 21 of the motor, and on the other side through wires 104, 106 and 73, with a contact 67. If desired, there may be included in this circuit a resistance, indicated at 105. The contact 67 is normally separated from a coöperating contact 69, which is connected through wire 74, to wire 51, and hence when this circuit is closed through contacts 67, 69, an auxiliary shunt field circuit is established in which is included auxiliary field coils, thereby strengthening the magnetic field of the motor and hence tending to impede or retard the speed thereof. The contacts 67, 69, may be closed upon each other in any suitable manner, as, for instance, by magnet 60, arranged, as above indicated, to be automatically energized sufficiently when an undue or excessive speed of the motor is attained.

If desired, the methods above described of applying an electro-dynamic brake and of strengthening the magnetic field of the motor in the accomplishment of the objects of my invention, may be combined in their action, or may be carried out at the same time, as, for instance, by connecting both contacts 66 and 67, through insulation 70, and a rod 72, with the core armature 71, of magnet 60, any suitable arrangement being employed to maintain the contacts 66 and 67 normally separated from their respective cooperating contacts 68 and 69. In one arrangement for accomplishing this result I employ a spring 64, secured at one end at 65, and connected at the other end to the rod 72, the tension of said spring operating to normally maintain contacts 66 and 67, and their cooperating contacts 68 and 69, separated until magnet 60 becomes sufficiently energized to overcome such tension.

I have illustrated in Fig. 2 another arrangement embodying the principles of my invention, wherein the circuit of the motor may be automatically broken by including contacts 68', and 69' in a convenient part of the motor circuit, and normally maintaining such circuit closed by means of cooperating electrically connected contacts 66' and 67'. In this case the energization of magnet 60 to a sufficient extent will break the motor circuit by separating the contacts 66' and 67', respectively, from contacts 68', 69'.

If desired, all three methods above described may be combined. That is, the electro-dynamic brake may be applied, the magnetic field of the motor may be strengthened, and the circuit of the motor broken in successive order, and in Fig. 3 I have illustrated a means for accomplishing this combined result, wherein two magnets 60 are associated, one designed to effect the first two steps, and the other the final step of the operation, said magnets being so relatively wound and adjusted as to properly perform these functions.

In the foregoing description I have referred to the magnet 60 as being sufficiently energized when the motor attains an undue or excessive speed or operates as a generator, to effect the operation explained. To this end, the coil 62', of magnet 60, may be included in a shunt circuit across the motor armature and so relatively wound as to effect proper or sufficient energization of the magnet only when the motor attains an undue or excessive speed or operates as a generator. This arrangement is illustrated in Fig. 4.

Another and a preferable way is shown in Figs. 2 and 3, wherein the magnet is provided with oppositely wound coils 62, and 53. The magnet may therefore be termed a doubly wound magnet or a differential magnet. The coil 53 is included in series with the armature circuit of the motor, while the coil 62 is included through wires 63 and 61, in a shunt circuit around the motor armature. Under these conditions it will be observed that the energizing effects of these coils upon magnet 60 tend to counterbalance or neutralize each other when currents are flowing through the circuits of said coils. The energizing effect of coil 62, however, will vary with the variation of potential at the armature brushes, since said coil is shunted across the armature, and the energizing effect of the coil 53 will vary with the current through the armature and consequently when the potential across the brushes sufficiently increases by the attainment of an undue or excessive speed, the overbalancing or neutralizing effect of coil 53 is overcome and magnet 60 will become sufficiently energized to accomplish the objects and purposes above set forth. In other words, the coils tend to neutralize each other and the magnet comprising said coils becomes sufficiently strong to operate its switch only when the difference in the strengths of these coils becomes great enough. Ordinarily the same time that the coil 62 strengthens the coil 53 weakens, thus increasing the differential action of the entire magnet.

In case the motor becomes a generator so that it sends current back into the line, then the flow of current through coil 53 will coincide in direction with that through coil 62, and the same results will be secured.

It is believed that the operation will be fully understood from the foregoing description, but for the sake of clearness will be briefly described.

Suppose contact 12 is moved into contact with contact 13, a circuit is thereupon established, as follows: from positive main 7, wire 16, contact 12, contact 13, wire 18, magnet 91, wire 95, to negative main 5. The resulting energization of magnet 91 results in rocking lever 80 to the left thereupon completing the following circuit: from positive main 7, to contact 85, contact 83, contact 86, wire 25, brush 23, armature 21, brush 22, wire 26, contact 87, contact 82, contact 56, wire 54, coil 53, wire 51, series field 50, resistance 40, wire 41, to negative main 5. The shunt field circuit is completed from positive main 7, through wire 102, shunt field 100, wire 101, wire 41, and negative main 5. The motor now starts up and all the subsequent operation is automatic. As the motor accelerates, the resistances 40, and the series field coils 50, are gradually cut out, the circuit being successively completed through wires 43, 44, 45 and 42.

Should the motor attain an undue or excessive speed or should it become a generator, magnet 60 becomes energized sufficiently to cause contacts 66 or 67, or both, to complete circuit connection with contacts 68 and 69, respectively, thereby completing a shunt circuit around the armature from contact 86, through contact 77, wire 75, contacts 68, and 66, wire 76, and resistance 79, to contact 78 and contact 87. The closing of contacts 67 and 69, closes the auxiliary field circuit from wire 51, through wire 74, contacts 69 and 67, wire 73, wire 106, resistance 105, wire 104, and auxiliary field coils 103, to the shunt field circuit wire 102, and thence on to the positive main 7. Or the energization of magnet 60 may operate to break the motor circuit as indicated in Fig. 2, or to combine the several methods described as in Fig. 3.

I have above traced the circuit when the contact 12 is moved into position to close the circuit through contact 13. When said contact 12 is moved to close circuit through contact 14, the circuit of magnet 92 is completed, and hence the lever 80 is rocked towards the right. The only difference resulting is that the circuit through the motor armature is reversed.

Having now set forth the object and nature of my invention, and various constructions and arrangements for accomplishing such objects, what I claim as new and useful and of my own invention, and desire to secure by Letters Patent, is:

1. The combination with a compound-wound motor, of means entirely electrical for reducing the speed of the motor, and means made operative by undue or excessive speed of the motor and when said motor becomes a generator for bringing into action said speed reducing means.

2. The combination with a motor, of an auxiliary field circuit, resistance in said auxiliary field circuit, and means made operative by an undue speed of the motor for closing said circuit.

3. The combination with a compound wound motor, of an additional field circuit, and means made operative by an undue or excessive speed of the motor for inserting said additional field circuit.

4. The combination with a compound wound motor, of an additional field circuit, resistance in said circuit, and means made operative by an undue or excessive speed of the motor for inserting said additional field circuit.

5. The combination with a motor, of an auxiliary shunt field circuit for said motor, and means made operative by an undue speed of the motor for closing said circuit.

6. The combination with a compound-wound motor, of an additional shunt field circuit for said motor, and means made operative by an undue speed of the motor for connecting said additional circuit in parallel with the shunt winding of the motor.

7. The combination with a compound-wound motor, of an additional shunt field circuit for said motor, resistance in said additional circuit, and means made operative by an undue speed of the motor for connecting said additional circuit in parallel with the shunt winding of the motor.

8. The combination with a motor, of a dynamic brake and an auxiliary field circuit therefor, and means made operative by an undue or excessive speed of the motor for effecting the operation of said dynamic brake and the closure of said auxiliary field circuit.

9. The combination with a motor, of an auxiliary field circuit for said motor, a normally open circuit in shunt to the motor-armature, and means made operative by excessive speed of the motor for completing said field circuit and for completing said shunt circuit.

10. The combination with a compound-wound motor, of devices wholly electrical for reducing the speed of the motor, and means made operative by undue or excessive speed of the motor and when said motor becomes a generator for bringing into action said electrical devices.

11. The combination with a compound-wound motor, of means entirely electrical for reducing the speed of the motor, and electrical devices made operative by the undue or excessive speed of the motor and when the motor becomes a generator for bringing into action said speed reducing means.

12. The combination with a compound-wound motor, of electrical devices for reducing the speed of the motor, and electrical devices made operative by undue or excessive speed of the motor and when said motor acts as a generator for bringing into action said speed reducing devices.

13. The combination with a motor, of an electro-dynamic brake circuit, and means operated by undue or excessive speed of the motor and upon conversion of the same into a generator for varying said circuit to effect a reduction of speed of said motor.

14. The combination with a motor, of means for strengthening the magnetic field of the motor, by adding extra coils and means dependent upon the armature potential and made operative by the undue or excessive speed of the motor for making effective said field strengthening means.

15. The combination with a motor, of means dependent upon the armature current and made operative by the undue or excessive speed of the motor for strengthening the magnetic field of the motor.

16. The combination with a motor, of an auxiliary field circuit for said motor, and means made operative by an undue speed of the motor for closing said circuit.

17. The combination with a motor, of a circuit breaker arranged in the motor circuit, and means dependent upon the armature potential and made operative by an excessive speed of the motor for operating said circuit breaker.

18. The combination with a motor, of a dynamic brake and an auxiliary field therefor, shunt circuits for said brake and auxiliary fields, and means made operative by an undue or excessive speed of the motor for completing said shunt circuits.

19. The combination with a motor, of a resistance, a circuit therefor, said circuit being in shunt to the motor, an auxiliary field circuit, and means made operative by the excessive speeds of the motor for completing said circuits.

20. The combination with a motor, of a circuit therefor, a circuit breaker arranged therein, an electro-dynamic brake, a circuit therefor in shunt to the motor, and means made operative by excessive speed of the motor for completing said brake circuit and operating said circuit breaker in succession.

21. The combination with a motor, a circuit therefor, a circuit-breaker arranged therein, an electro-dynamic brake, a shunt circuit therefor, an auxiliary shunt field circuit, and means made operative by excessive speed of the motor for completing said auxiliary field and brake circuits and operating said circuit breaker in succession.

22. The combination with a motor, an electro-dynamic brake comprising a circuit independent of the field circuit of said motor, and a magnet to effect the application of such brake to the motor, and means for strongly energizing such magnet when the armature of the motor is rotated at excessive speed.

23. The combination with a motor, of an electric retarding device comprising an extra field winding for such motor, a magnet for effecting the application of such retarding device, but of insufficient strength when energized by the normal current passing through the motor, and means actuated by excessive speed of the motor and upon conversion of the same into a generator for strongly energizing said magnet to perform its function.

24. The combination with a motor, a source of electrical supply, a retarding device for the motor, a magnet for applying the retarding device having two windings, one of which is directly connected across the armature of the motor and neutralizes the effect of the other when the motor is receiving current from the source of supply, and which assists the other when the motor is generating current.

25. The combination with a motor, a resistance, circuits and contacts arranged to connect said resistance across the armature of the motor, and a magnet for controlling said contacts, said magnet only having sufficient strength to attract its armature and move its contacts when the motor armature has excessive speed.

26. The combination with a motor having an armature and a shunt field, a resistance, an extra shunt field, circuits and contacts arranged when closed to connect said resistance across the armature of the motor, and to energize the extra shunt field, and a magnet which closes said contacts whenever the speed of the motor gets excessive.

27. The combination with a motor, of a resistance, circuits and contacts arranged to connect said resistance across the armature of the motor, and a magnet having its terminals connected directly across the armature and arranged to control said contacts to effect a reduction of speed of the motor when said speed becomes excessive or to effect a reduction of the speed of the motor upon conversion of the same into a generator.

28. The combination with a motor, controlling apparatus therefor, a doubly wound magnet having one winding in circuit with the motor-armature and the other winding connected across the motor-armature, and electric means controlled by said magnet for regulating the speed of the motor.

29. The combination with a motor, of controlling apparatus therefor, a differentially wound magnet having one winding connected across the motor-armature and another winding in circuit with the motor-armature; and electric means controlled by said magnet for slowing down said motor when excessive speed is attained, or upon conversion of the same into a generator.

30. The combination with a motor, of starting means therefor, a differentially wound relay having one winding connected across the motor-armature and the other winding in series with the motor-armature, an electro-dynamic brake circuit, and means controlled by said relay for closing said circuit when the motor acts as a generator.

31. The combination with a motor, of reversing switches therefor, a differential relay having one winding connected across the motor-armature and the other winding in a normally open circuit with the motor-armature, means controlled by said relay for regulating the speed of said motor, and means for operating said reversing switches to close said normally open circuit and effect a starting of the motor in the desired direction.

32. The combination with a motor, of controlling means therefor, a doubly wound electro-magnet, a plurality of resistances, and means controlled by said electro-magnet for inserting one of said resistances in the local circuit in series with the motor-armature, and another of said resistances in shunt to the motor.

33. The combination with an electric motor, of controlling apparatus therefor, a doubly wound magnet, two resistances, an extra field coil for the motor, and means controlled by said magnet for inserting one of said resistances in a local circuit in series with the motor-armature and the other with said extra field coil in shunt to the motor when the motor acts as a generator.

34. The combination with a motor, of controlling apparatus therefor, a differential relay, and means comprising a circuit independent of the field circuit, and controlled by said relay for effecting a stopping of said motor when the same acts as a generator.

35. The combination with a motor, of means entirely electrical and comprising a circuit independent of the field circuit for reducing the speed of the motor, and means made operative by undue or excessive speed of the motor for bringing into action said speed-reducing means.

36. The combination with an electric motor, of controlling apparatus therefor, a doubly wound magnet having one winding connected directly across the motor armature and the other winding arranged to be connected in series with the motor armature, and electric means controlled by said magnet for regulating the speed of the motor.

37. The combination with an electric motor, of controlling apparatus therefor, a differentially wound magnet having one winding connected directly across the motor armature and another winding in circuit with the motor armature; and electric means controlled by said magnet for slowing down said motor when excessive speed is attained, or upon conversion of the same into a generator.

38. The combination with an electric motor, of reversing switch apparatus therefor, a differential relay having one winding connected directly across the motor armature and the other winding in a normally open circuit with the motor armature, and means controlled by said relay for limiting the speed of said motor.

39. The combination with an electric motor, of controlling apparatus therefor comprising reversing switch mechanism and accelerating mechanism, an electro-dynamic brake circuit normally open, and two differential relays one for controlling the motor circuit and the other for controlling both the electro-dynamic brake circuit and said extra field circuit, one of the windings of each of said relays being arranged to be connected in circuit with the motor armature, and the other winding of each of said relays being connected across the motor armature.

In testimony whereof, I have hereunto set my hand this 24th day of September, 1904, in the presence of the subscribing witnesses.

JOHN D. IHLDER.

Witnesses:
W. H. STOKES,
HENRY E. KIRBY.